United States Patent
D'Antoni et al.

(10) Patent No.: US 11,075,835 B2
(45) Date of Patent: Jul. 27, 2021

(54) DISTRIBUTED, PACKET-MEDIATED, PACKET ROUTING

(71) Applicant: Wisconsin Alumni Research Foundation, Madison, WI (US)

(72) Inventors: Loris D'Antoni, Madison, WI (US); Srinivasa Akella, Middleton, WI (US); Kausik Subramanian, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/701,703

(22) Filed: Dec. 3, 2019

(65) Prior Publication Data
US 2021/0168063 A1 Jun. 3, 2021

(51) Int. Cl.
*H04L 12/707* (2013.01)
*H04L 12/703* (2013.01)
*H04L 12/715* (2013.01)
*H04L 12/751* (2013.01)
*H04L 12/721* (2013.01)
*H04L 12/935* (2013.01)

(52) U.S. Cl.
CPC .............. *H04L 45/22* (2013.01); *H04L 45/02* (2013.01); *H04L 45/04* (2013.01); *H04L 45/28* (2013.01); *H04L 45/70* (2013.01); *H04L 49/3009* (2013.01)

(58) Field of Classification Search
CPC ......... H04L 45/22; H04L 45/02; H04L 45/04; H04L 45/28; H04L 45/70; H04L 45/507; H04L 45/74; H04L 49/3009; H04L 49/25; H04L 41/0654
See application file for complete search history.

(56) References Cited

U.S. PATENT DOCUMENTS

| | | | | |
|---|---|---|---|---|
| 8,000,327 B1* | 8/2011 | Minei | ................... | H04L 45/306 |
| | | | | 370/392 |
| 8,018,964 B2* | 9/2011 | Eckert | ..................... | H04L 45/30 |
| | | | | 370/432 |
| 9,100,328 B1* | 8/2015 | Atlas | ....................... | H04L 45/28 |
| 10,841,216 B1* | 11/2020 | Hoang | .................. | H04L 12/462 |
| 2004/0006613 A1* | 1/2004 | Lemieux | ............. | H04L 41/5022 |
| | | | | 709/223 |
| 2010/0061230 A1* | 3/2010 | Xiong | ................. | H04L 43/0817 |
| | | | | 370/225 |

(Continued)

OTHER PUBLICATIONS

Roshan Sedar et al.; "Supporting emerging applications with low-latency failover in p4," ACM ISBM 978-1-4503-5907-8; pp. 1-6 (2018). Hungary.

(Continued)

*Primary Examiner* — Kibrom T Hailu
(74) *Attorney, Agent, or Firm* — Boyle Fredrickson, S.C.

(57) ABSTRACT

A network switch holds a routing table and a network topology table so that when a link failure is detected at the network switch, the network switch may independently reroute a packet intended for that failed link using the network topology table. This processing can be performed in the data plane at a speed that can eliminate dropped packets. Intercommunication with a central controller is not required and intercommunication with other network switches may be accomplished through data plane communication by embedding the link failure information in the affected packet.

16 Claims, 5 Drawing Sheets

(56) References Cited

U.S. PATENT DOCUMENTS

| | | | | |
|---|---|---|---|---|
| 2015/0109902 A1* | 4/2015 | Kumar | ................ | H04L 41/0668 |
| | | | | 370/219 |
| 2015/0109904 A1* | 4/2015 | Filsfils | .................... | H04L 45/34 |
| | | | | 370/221 |
| 2015/0271103 A1* | 9/2015 | Thayalan | ................ | H04L 49/25 |
| | | | | 370/217 |
| 2018/0375769 A1* | 12/2018 | Tamizkar | ................ | H04L 45/02 |
| 2019/0149457 A1* | 5/2019 | Perrett | .................... | H04L 45/28 |
| | | | | 370/216 |
| 2019/0182152 A1* | 6/2019 | Yan | ......................... | H04L 45/54 |

OTHER PUBLICATIONS

Chi-Yao Hong et al.; "Achieving high utilization with software-driven WAN." In ACM SIGCOMM Computer Communication Review, vol. 43, No. 4, pp. 15-26. ACM, 2013. China.

Edgar Costa Molero et al., "Hardware-accelerated network control planes." In Proceedings of the 17th ACM Workshop on Hot Topics in Networks, pp. 120-126. ACM, 2018. US.

\* cited by examiner

//DISTRIBUTED, PACKET-MEDIATED, PACKET ROUTING

STATEMENT REGARDING FEDERALLY SPONSORED RESEARCH OR DEVELOPMENT

This invention was made with government support under 1763871 awarded by the National Science Foundation. The government has certain rights in the invention.

CROSS REFERENCE TO RELATED APPLICATION

--

BACKGROUND OF THE INVENTION

The present invention relates to networks of electronic network switches for communicating data between computers, and in particular, to an architecture for network switches in such a network that can provide independent, distributed routing of packets facilitated with non-destination packet header data.

Computers may share data with other computers through computer networks composed of electronic network switches joined by communication links, typically implemented over electrical conductors or wireless media. The data may be sent in "packets" composed of a packet header, indicating the ultimate destination of the packet, and a packet payload holding the data to be transmitted. Each network switch in the network holds a routing table linking packet ultimate destinations to a next "hop," a hop being a next link from the network switch to a next network switch in a sequence of network switches that leads to the ultimate destination. In operation, each network switch reads the packet header of incoming packets and uses the routing table to forward the packet to a next network switch according to the packet's ultimate destination.

The transmission of packets occurs on a "data plane" managed by network switch hardware, protocols, and links which are optimized for speed. Because the routing table of each network switch only needs to provide the next "hop" for each destination, the routing table can be compact allowing it to be stored in high-speed memory such as associative memory.

The routing tables held by each network switch are normally loaded at a configuration time from a central network controller communicating with the network switches on a "control plane." The control plane typically provides much lower transmission rates than the data plane. This lower bandwidth of the control plane is consistent with its use of a general-purpose and thus more versatile processor core accessing data from random access memory rather than associative memory.

When a failure occurs in a link in the network, the routing tables in affected network switches need to be updated by the central network controller to provide new "hops" that avoid the failed link. Link failures are not uncommon and can be caused by interruptions in the transmission media (e.g., loose wires, etc.), network switch circuitry overheating, and power supply issues, as well as software and firmware errors.

In some networks, the network switches can detect link failure by monitoring traffic or electrical continuity in links directly connected to that network switch. These failures can then be reported over the control plane to the central network controller which can compute and download new routing tables. This process of detecting link failure and providing new routing table information is time-consuming and normally results in the loss of multiple packets before new routing tables are received. The process of updating the routing tables of multiple network switches by the central controller can require complex updating schedules to prevent piecemeal updating of network switch tables that could lead to inconsistencies such as infinite packet loops.

The need for a central controller for rerouting can be avoided in "distributed control plane" solutions where the network switches communicate among each other over the control plane to develop new routing tables. This cooperative approach, however, can take a significant amount of time before it converges on a new set of routes, and thus also typically results in the dropping of many packets.

Packet loss can be minimized to some extent by creating backup routing tables that anticipate particular link failures and provide precomputed options for rerouting to avoid those failures. At best, however, this approach can accommodate only a limited number of failure scenarios and this approach greatly increases the size of the routing table and the cost of high-speed associative memory.

SUMMARY OF THE INVENTION

The present invention provides a network switch architecture that allows each network switch to independently recompute packet routing in the event of a link failure without communication over the control plane with other network switches or a central controller. A network switch detecting an immediate link failure modifies the packet header of the packet using that failed link to identify that failed link and then makes use of a table of the network topology to reroute the packet to a new hop. This self-contained rerouting of packets eliminates the communication bottlenecks with the central controller or other network switches. The present inventors have determined that this rerouting can be performed in the data plane to practically eliminate dropped packets. A similar mechanism that is used for rerouting may be used to implement routing changes resulting from policies or the like, again without communication with a central controller or other network switches over the control plane.

Specifically, in one embodiment, the invention provides an architecture for a network switch adapted for use in a network of multiple network switches communicating packets via communication links between hosts. The network switch includes interface circuitry for the communication of packets between the network switch and one or more communication links with other network switches and at least one computer memory holding: (a) a routing table linking packet destinations to next hops, the next hops indicating specific ones of the other network switches to which a packet having the packet destination should be forwarded on a path to the packet destination and (b) a network table describing a topology of intercommunications between the network switch and other network switches via the communication links. The network switch may further include packet processing circuitry operating to: (a) receive a given packet over the interface circuitry; (b) apply a destination of the given packet to the routing table to determine a next hop; (c) when the next hop is not available, embed unavailability information in the given packet identifying the unavailable next hop to create a modified given packet; (d) analyze the network table and any next hop unavailability information embedded in the given packet to identify a new next hop; and (e) transmit the modified packet to the new next hop over the interface circuitry.

It is thus a feature of at least one embodiment of the invention to avoid the need for slow control plane communication for rerouting when a link becomes unavailable through the use of network switch-located network tables mediated by modified packets providing information about unavailable links to other network switches.

The packet processing circuitry may further operate to identify failed communication links from the given network switch and identify the unavailable next hop according to whether a communication link of the next hop has failed.

It is thus a feature of at least one embodiment of the invention to allow the network switch, where a link failure occurs, to reroute packets independently and rapidly, reducing or eliminating packet loss.

The network switch may further include a scheduled maintenance table, and the step of identifying the unavailable next hop may further determine that a next hop is unavailable if it is scheduled to be unavailable in the scheduled maintenance table.

It is thus a feature of at least one embodiment of the invention to provide an orderly system for scheduled maintenance reducing or eliminating packet loss.

The routing table may include multiple next hops for a given destination. In one embodiment the multiple next hops may be associated with priority numbers, and the packet processing circuitry may operate to select a next hop from the multiple next hops according at least in part to the priority numbers of the multiple next hops.

It is thus a feature of at least one embodiment of the invention to permit prioritization of rerouting by the network switches to promote load leveling among network switches through priority numbers embedded in the packet.

The priority numbers may provide a weighting biasing a network switching among the multiple next hops to determine a next hop.

It is thus a feature of at least one embodiment of the invention to permit static priority numbers to affect a steering of traffic among along multiple routes in a statistical fashion without a need for constant updating by a central controller.

The routing table may link the multiple next hops with policy numbers associated with particular types of packet data, and the packet processing circuitry may operate to select a next hop from the multiple next hops at least in part according to the type of packet data of the given packet.

It is thus a feature of at least one embodiment of the invention to permit the network switches to perform routing that is in accordance with network policies such as those affecting quality of service.

A given packet may include both a middle box requirement and the destination of the packet, and the packet processing circuitry may apply a destination of the at least one middle box requirement to the network table to identify the next new hop if the network switch is not a network switch controlling packets received directly by a middle box of that requirement. If the network switch is a network switch directly connected to the middle box of that requirement, the packet processing circuitry may remove the corresponding middle box requirement from a given packet in creating the modified given packet.

It is thus a feature of at least one embodiment of the invention to permit the network switches to preserve a path through one or more middle boxes during rerouting.

The network switches of the network may be divided into domains, and the network table may describe the topology of intercommunication of the network switches in a domain holding the given network switch but only for some network switches in other domains.

It is thus a feature of at least one embodiment of the invention to manage the size of the network table by abstracting the network switches into domains whose internal topologies are only stored in the network tables of network switches in those domains.

The packet processing circuitry may route subsequent packets to the given packet without regard to unavailability information embedded in the given packet.

It is thus a feature of at least one embodiment of the invention to eliminate the need to transmit messages among the network switches when links become available after having been unavailable.

The network switch may further include a processing core operating to communicate with a central network controller to receive the routing table and network table.

It is thus a feature of at least one embodiment of the invention to provide a rerouting at the network switch level in the data plane and thus providing rerouting that can be done at a high speed that can substantially eliminate packet loss on link failure.

The packet processing circuitry may identify a new next hop through a breadth-first search of the network table.

It is thus a feature of at least one embodiment of the invention to provide a rerouting process that can be rapidly implemented on data plane circuitry.

These particular objects and advantages may apply to only some embodiments falling within the claims and thus do not define the scope of the invention.

DETAILED DESCRIPTION OF THE PREFERRED EMBODIMENT

Figure 1:
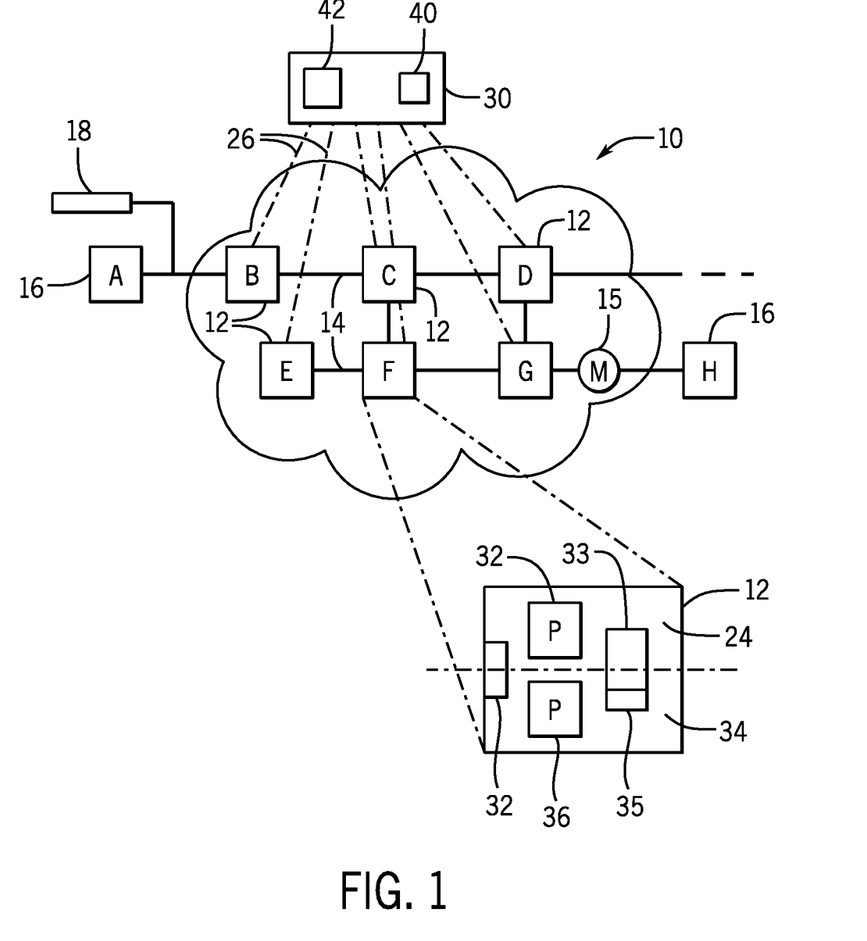
FIG. 1 is a block diagram of a network of network switches communicating via links to connect hosts, showing data plane communication between the network switches for data communication and showing control plane communications between the network switches and a central controller for network configuration, each network switch providing for separate control plane and data plane execution paths.

Referring now to FIG. 1, a computer network 10 may provide for a set of network switches 12 (designated by letters B-G) and, for example, one or more middle boxes 15

(designated by the letter M) interconnected by links 14. As is generally understood in the art, middle boxes 15 are network appliances that perform operations on packets 18 distinct from their routing such as providing firewalls, network address translators, network optimizers, intrusion detection devices, and the like. The switches 12, middle boxes 15, and links 14 provide data communication paths between hosts 16 (designated by letters A-H) such as computers or the like. The links 14 may be, for example, electrical conductors such as backplanes, ethernet cables, and the like or other digital communication media including wireless media. In one embodiment the switches 12 may be programmable switches that can run P4, a programming language defining packet-forwarding behavior created in 2013 by the P4 Language Consortium such as the Tofino ASIC available from Barefoot Networks of Santa Clara, Calif., USA.

Each network switch 12 will normally provide two separate processing paths for data received from an interface circuitry 22. The first path, termed a control plane 24, provides a communication channel for control signals 26 received from a central network controller 30 by the network switches 12 and is managed using a general-purpose computer core 32 accessing a random-access memory 33 and a special associative memory 35. The second path, termed a data plane 34, uses a dedicated packet processing circuitry 36 (for example, the ASIC described above) and will exclusively or primarily communicate with the special associative memory 35 allowing high-speed data access rerouting. Generally, the processing of packets 18 by the packet processing circuitry will be many times faster than that processing that can be performed on the general-purpose computer core 32, although latter has a far more extensive instruction set than the former, for example, executing the P4 instruction set. Normally, the control plane 24 and the data plane 34 may use the same links 14 and interface circuitry 22 but execute different protocols and provide different bandwidth communication. The bandwidth of the communication over the control plane is much lower than the bandwidth of the data plane communicating the packets 18, for example, by a factor of 10 or more.

The computer network 10 will normally not be fully connected meaning that each network switch 12 communicates only with a subset of other network switches 12 limiting the number of paths between the hosts 16. The pattern of intercommunication between network switches 12, middle boxes 15, and links 14 defines a network topology which is used by the central network controller 30 to develop routing tables for routing of packets 18 through the network 10. In this example, host A can communicate with host H only through two paths of B, C, D, G, and M or B, C, F, G, and M.

Figure 2:
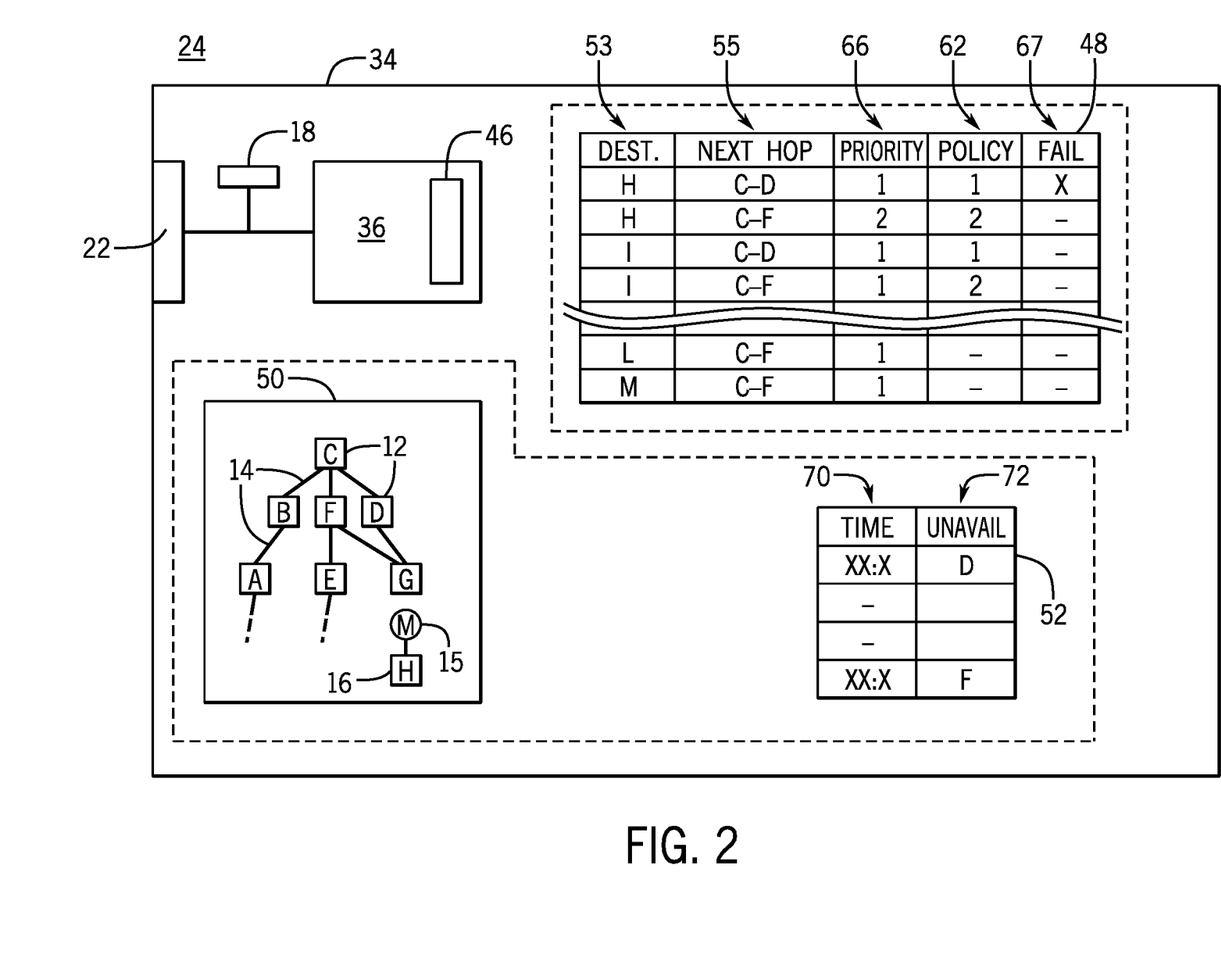
FIG. 2 is a detailed block diagram of the data structures of the data plane of the network switches showing a packet processing circuit working with an augmented routing table providing priority and policy information, a maintenance schedule indicating scheduled link outage, and a network topology table describing the interconnections of multiple network switches in a network.

Referring now to FIGS. 1 and 2, during operation, the central network controller 30, executing a control program 40, stored in computer memory and using one or more processors 42, may send configuration information on control signals 26 to each of the network switches 12 to be processed by the general-purpose computer core 32 in the control plane 24. This configuration information on control signals 26 is used to configure the network switches 12 to process packets 18 by the data plane 34, for example, by providing a routing table 48, network table 50, and scheduled maintenance table 52 as will be discussed below. The packet processing circuitry 36, in turn, executes a firmware program 46 to process packets 18 received over the interface circuitry 22 from other network switches 12 or host 16 and forward those packets to other network switches 12 or host 16.

For this purpose, the packet processing circuitry 36 uses the routing table 48 to determine a next hop in the network 10 based on host destination found in each packet. As will be discussed, on occasions, the packet processing circuitry 36 updates its own routing table 48 using the network table 50 providing a topology of the entire network and the maintenance table 52 which provides information about scheduled loss of particular links 14.

Referring still to FIG. 2, routing table 48, in the manner of a conventional routing table, provides a logical first column providing a packet destination field 53 identifying particular hosts 16 using a unique host identification number. Each host of the packet destination field 43 is linked by a common row of the routing table 48 to a second column indicating a next hop field 55 for that packet 18. The next hop field 55 describes a link 14 (denoted in this example by the endpoint switches) from the current network switch 12 to another network switch 12. The example routing table 48 of FIG. 2 has been populated with respect to network switch C of FIG. 1.

Figure 4:
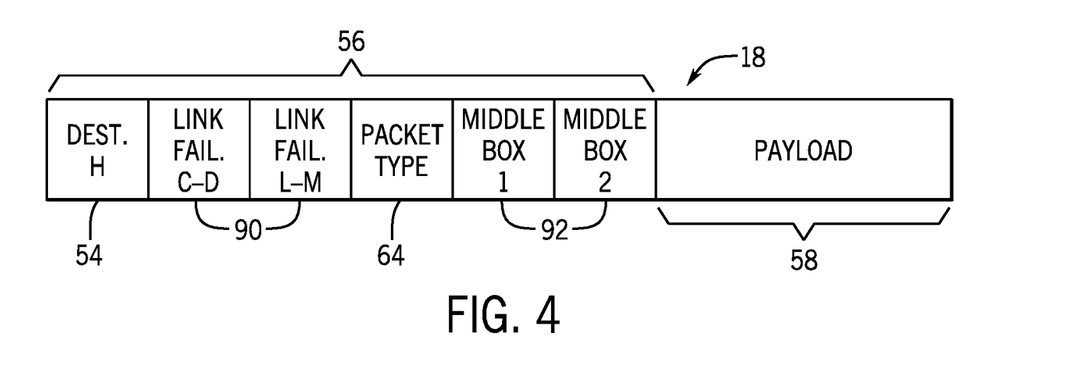
FIG. 4 is a diagrammatic representation of a packet used in the present invention.

The routing table 48 is consulted as each packet 18 arrives at the data plane 34. Referring also to FIG. 4, arriving packets include a host destination 54 forming part of the packet header 56 preceding to the packet payload 58. This host destination 54 is used as an index to the routing table 48 (e.g., matched to a destination in packet destination field 53) and used to obtain the next hop for that particular packet per the next hop field 55.

In the present invention, the routing table 48 may be augmented to also provide a priority number field 60 indicating a preferred row for use in routing when multiple rows have the same destination field 53. Similarly, a policy number field 62 may be provided to allow a selection among multiple rows with the same destination field according to a policy that may be linked with a packet type 64 in the packet headers 56. Each row of the routing table 48 may also be associated with an unavailable field 67 indicating whether the link in that row's next hop field 55 has failed (indicated schematically by an "X" in that column). The routing table 48 may be held in high-speed associative memory 35 to allow high-speed routing of packets 18.

The data plane 34 may further include a network table 50 describing the topology of the entire network 10 typically listing each of the network switches 12, middle boxes 15, and destination hosts 16 and the particular linkages through links 14 for the network. The data plane 34 also includes a data structure of a maintenance table 52 providing information about scheduled maintenance of the links 14 (or their scheduled switches 12 or middle boxes 15) using a first time field 70 providing a time duration of the scheduled maintenance linked by rows to particular unavailable links 14 at those times provided in an unavailability field 72. The packet processing circuitry 36 may periodically review the maintenance table 52 and, according to the current time, update the unavailable field 67 indicating a particular link 14 is unavailable by reference to unavailability field 72 of to this table 52.

Figure 3:
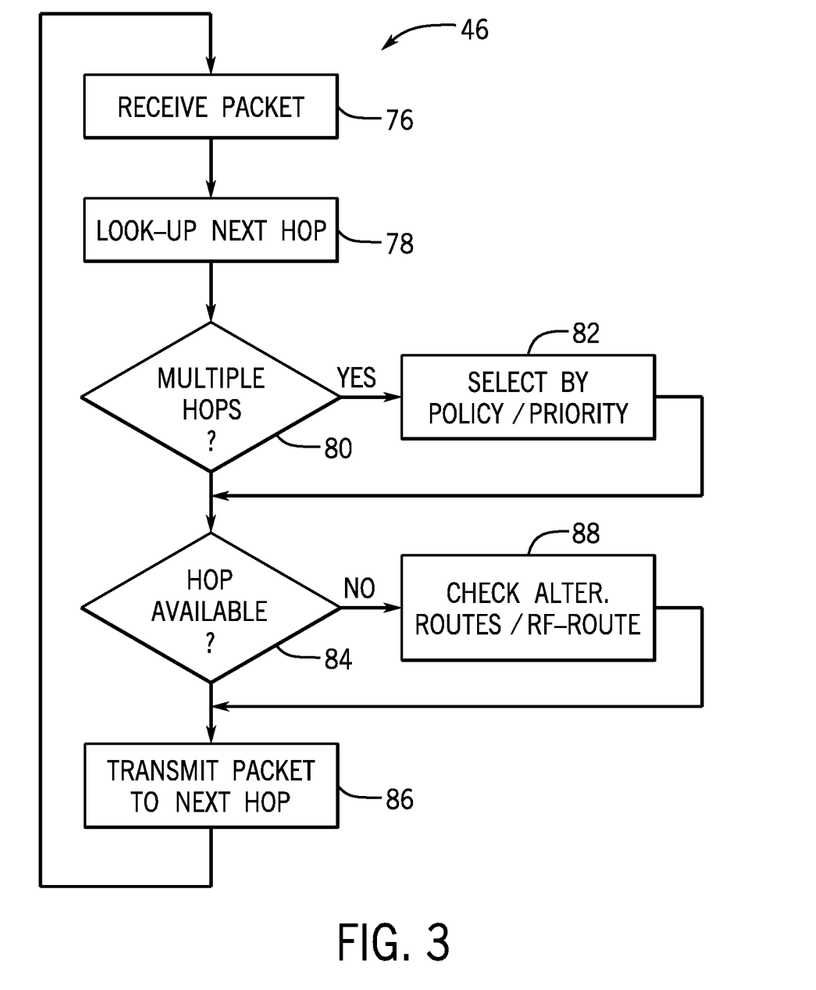
FIG. 3 is a flowchart describing the operation of the packet processing circuit in handling packets using the data structures of FIG. 2.

Referring now also to FIG. 3, during operation of the data plane 34, the packet processing circuitry 36 executing the firmware program 46 may receive a given packet 18 as indicated by process block 76. In this process, the header 56 of the packet 18 is reviewed to determine the host destination 54 (e.g., H), and the value of this host destination 54 is applied to the routing table 48 to determine one or more listed next hops per process block 78.

At decision block 80, the results of the indexing of the routing table 48 are reviewed to see if there are multiple rows which satisfy the requirement that the destination 54 of the packet 18 match the destination field 53 of the network table 50.

In cases where there is only a single matching row, the program 46 proceeds to decision block 84 directly; however, in the present example, where there are two such matches yielding two different possible links 14 (e.g. C-D or C-F), the program proceeds to process block 82 to select among these rows and links 14 according to either a priority number per priority number field 60 or policy number according to policy number field 62. First, the policy number field 62 is compared against a packet type 64 in the packet header 56. Packet types 64 are used, for example, to provide quality of service assurances for certain types of packets 18 to make sure they are routed along the fastest possible way. If there is only a single match between the packet type 64 and the policy number field 62, the hop designated by that single matching row in the next hop field 55 is used.

If there are multiple matches between the packet type 64 and the policy number field 62 (e.g., identical policy numbers, or wildcard or null entries), the priority number field 60 is consulted to determine a priority between the multiple possible rows. This priority number is used statistically or probabilistically to weight a selection between the multiple rows to determine the next hop. The priority number may thus be used for load-balancing and may be assigned by the central network controller 30 at the time of configuration. Thus, for example, when there are two possible rows, a row with the highest priority may be selected 70% of the time and row with the lesser priority 30% of the time by applying weights, for example, to a range determined by a pseudo-random sequence.

Once a particular row of the routing table 48 has been selected, and thus a next hop determined from next hop field 55, it is determined whether this selected destination hop is available or whether it represents a broken link at decision block 84. For this purpose, the program 46 reviews unavailable field 67 indicating whether the selected link 14 has failed. As noted, a failure may be flagged in the unavailable field 67 if there is a scheduled maintenance indicated by maintenance schedule table 52. In addition, the network switch 12 may directly sense link failure by checking impedances on interface circuitry 22 or the activity on the interface circuit (lack of packets for a particular period of time) for the particular link 14 or other known diagnosis techniques.

If the selected next hop is available, then at process block 86 the packet is forwarded to the next hop, in this case network switch 12 designated D. In the case where the next hop is not available, then at process block 88 the availability of other links that matched the desired destination, following the method of decision block 80, are again reviewed to see if those links are available independent of the priority number field 60 and policy number field 62.

In the event that the designated hop of any row matching the desired destination 54 is unavailable, then at process block 88, the network switch 12 attempts to reroute the packet 18 in a way not indicated in the routing table 48 through the use of the network table 50. This rerouting process considers the location of the current network switch 12 (C) and must identify a final destination such as a host 16 (H) or a middle box 15.

In this regard, the final destination will be the host 16 (H) unless there is a middle box field flag 92 in the packet header 56 (shown in FIG. 4). Such a middle box flag 92 indicates the necessity of a middle box 15 being placed in the routing of the packets 18, and in this case, the middle box 15 that is identified is used as the final destination for the rerouting purposes. When there are one or more middle box flags 92, the middle boxes identified by the flags 92 are used in lieu of the destination host 16 for computing rerouting. When the packet 18 is received by a network switch 12 for routing to the middle box 15, the middle box flag 92 associated with that middle box is removed from the header 56. When there are multiple middle box flags 92 and one middle box flag 92 is removed, the next middle box flag 92 becomes the destination for rerouting until all middle box flags 92 have been removed.

With a destination identified (either the host 16 or middle box 15), the network table 50 is reviewed to find a new route. This rerouting considers not only the current failure indicated by unavailable field 67 but also considers any other failures that may be recorded in the header 56 of the packet 18. As shown in FIG. 4, previous failure flags 90 may have been added to the header 56 of the packet 18 by previous switches 12 which performed rerouting. Recording these link failures in previous failure flags 90 in the packet 18 prevents an infinite loop from being entered, for example, where two network switches 12 forward packets 18 between themselves when both switches 12 have network failures which lead them to reroute to the other network switch 12.

This rerouting considers all of the possible reroutes and submits multiple routes, if any, to the vetting process of decision block 80 and 84 to determine a single next hop for the given packet 18. Any of a variety of rerouting algorithms, including a breadth-first-search (BFS) and a depth-first-search (DFS) may be used; however, a BFS search is preferred for current switch 16 executing P4 because it reduces the number of recirculations through the packet processing circuitry 36 and also produces shorter network paths.

After the rerouting of process block 88, a failure flag 90 related to the current failed link 14 (causing the rerouting) is added to the header 56 for subsequent network switches 12. If there are multiple failed links from the given network switch 12, a failure flag 90 is added for each such failure. The packet 18 may be then transmitted per process block 86 to the selected next hop.

The rerouting process does not change the routing table 48, and accordingly, there is no persistence of new route. Accordingly, link failures indicated by failure flags 90 and by unavailable field 67 are reconsidered for each newly arriving packet 18. In this way, if failed links 14 recover, they are immediately available again without the need to circulate information among the switches 12.

Figure 5:
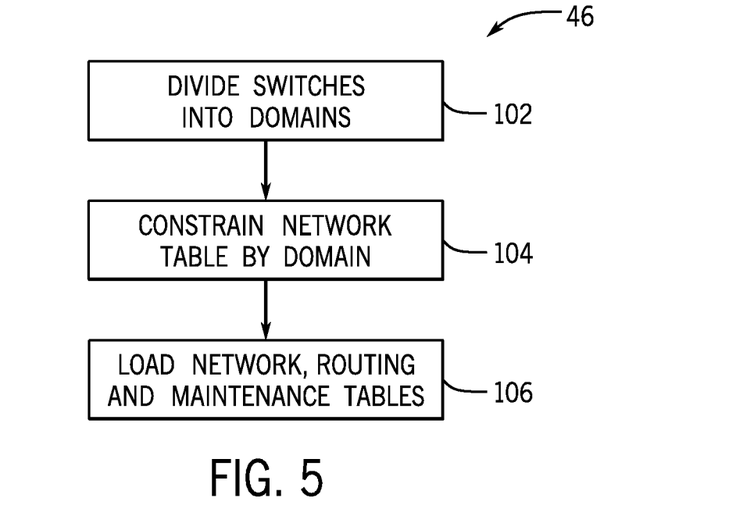
FIG. 5 is a flowchart of a program used by the central controller of FIG. 1.
Figure 6:
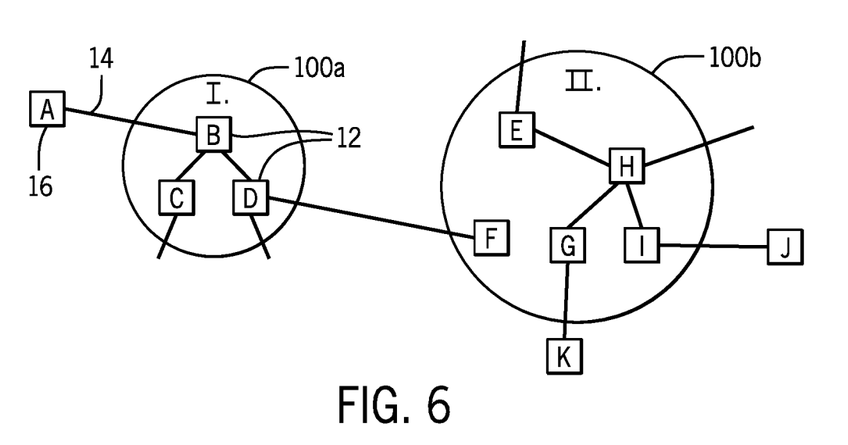
FIG. 6 is an example network that may use hierarchical network tables.
Figure 7:
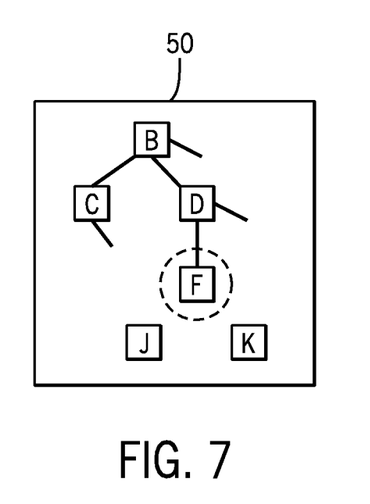
FIG. 7 is an example network table produced from the network of FIG. 6.

Referring now to FIGS. 5, 6 and 7, in one embodiment, the central network controller 30 may greatly reduce the size of the necessary network tables 50, particularly for large networks 10, and consequently increase the speed of the rerouting process, by preprocessing the network 10 into domains 100 of collections of network switches 12. For example, referring to FIG. 3, a network comprised of network switches B-I may be divided into a first domain 100a (designated 1) including network switches B-D and a second domain 100b (designated II) including network switches E-H. In this case each network switch 12 may be given knowledge only of its domain 100 plus the final destination hosts 16 and the edge network switches 12 for other domains 100. Thus, the network table 50 for network switch B, for example, may provide network connections to each of the network switches C and D (in its domain 1) and edge network switch F communicating between domains 100a and 100b (from domain II), but none of the interior network switches E, G-I of domain II, greatly reducing the size of the network table 50. The routing occurs as described before and when the packet arrives at the edge network switch F, and network table 50 for that network switch F provides knowledge of the interior network switches of domain II necessary to complete the routing. Ideally each domain 100 will have instances of middle boxes that are required for the routing. This reduction in the size of the network table 50 also allows it to fit in high-speed associative memory 35.

Thus, referring to FIG. 5, the control program 40 of the central network controller 30 may, prior to configuration time, divide the network switches 12 into domains 100 as indicated by process block 102. The network table 50 for each network switch 12 is constrained to its own domain, edge routers of adjacent domains, and destinations per process block 104, and at process block 106 the network switches are loaded with their network tables 50, routing tables 48, and the maintenance tables 52 as required.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An architecture for a network switch adapted for use in a network of multiple network switches communicating packets via communication links between hosts and the network switch comprising:
   interface circuitry for the communication of packets between the network switch and one or more communication links with other network switches;
   at least one computer memory holding:
   (a) a routing table linking packet destinations to next hops, the next hops indicating specific of the other network switches to which a packet having the packet destination should be forwarded on a path to the packet destination; and
   (b) a network table describing a topology of intercommunications between the network switch and other network switches via the communication links; and
   packet processing circuitry operating to:
   (a) receive a given packet over the interface circuitry;
   (b) apply a destination of the given packet to the routing table to determine a next hop;
   (c) when the next hop is not available, embedding unavailability information in the given packet identifying the unavailable next hop to create a modified given packet;
   (d) analyze the network table and any next hop unavailability information embedded in the given packet to identify a new next hop; and
   (e) transmit the modified given packet to the new next hop over the interface circuitry.

2. The architecture of claim 1 wherein the packet processing circuitry further operates to identify failed communication links from the given network switch and wherein the step of identifying the unavailable next hop determines that a next hop is unavailable if a communication link of the next hop has failed.

3. The architecture of claim 1 wherein the packet processing circuitry identifies failure of a communication link by at least one of monitoring traffic on the interface circuitry and detecting loss of electrical continuity on the interface circuitry.

4. The architecture of claim 1 wherein the network switch further includes a scheduled maintenance table and wherein the step of identifying the unavailable next hop determines that a next hop is unavailable if it is scheduled to be unavailable in the scheduled maintenance table.

5. The architecture of claim 1 wherein the routing table includes multiple next hops for a given destination.

6. The architecture of claim 5 wherein the routing table associates the multiple next hops with priority numbers and wherein the packet processing circuitry operates to select a next hop from the multiple next hops according at least in part to the priority numbers of the multiple next hops.

7. The architecture of claim 6 wherein the packet processing circuitry uses the priority numbers to provide a statistical weighting to the multiple next hops that switches among the multiple next hops according to the weighting to determine a next hop.

8. The architecture of claim 4 wherein the routing table associates the multiple next hops with policy numbers associated with particular types of packet data and wherein the packet processing circuitry operates to select a next hop from the multiple next hops at least in part according to the type of packet data of the given packet.

9. An architecture for a network switch adapted for use in a network of multiple network switches communicating packets via communication links between hosts and the network switch comprising:
   interface circuitry for the communication of packets between the network switch and one or more communication links with other network switches;
   at least one computer memory holding:
   (a) a routing table linking packet destinations to next hops, the next hops indicating specific of the other network switches to which a packet having the packet destination should be forwarded on a path to the packet destination; and
   (b) a network table describing a topology of intercommunications between the network switch and other network switches via the communication links; and
   packet processing circuitry operating to:
   (a) receive a given packet over the interface circuitry;
   (b) apply a destination of the given packet to the routing table to determine a next hop;
   (c) when the next hop is not available, embedding unavailability information in the given packet identifying the unavailable next hop to create a modified given packet;
   (d) analyze the network table and any next hop unavailability information embedded in the given packet to identify a new next hop; and
   (e) transmit the modified given packet to the new next hop over the interface circuitry;
   wherein the given packet includes at least one middle box requirement and the destination, and wherein the packet processing circuitry applies a destination of the at least one middle box requirement to the network table to identify the next new hop if the network switch is not a network switch controlling packets received directly by a middle box matching the at least one middle box requirement and if the network switch is a network switch controlling packets received directly by the middle box matching the at least one middle box requirement, and the packet processing circuitry removes corresponding middle box requirement from given packet in creating the modified given packet.

10. The architecture of claim 1 wherein the network switches of the network are divided into domains and the network table describes the topology of intercommunication of all network switches in a domain holding the given network switch and only some network switches and other domains.

11. The architecture of claim 10 wherein some network switches in other domains represent edge network switches of the other domains communicating with network switches in the domain of the given network switch.

12. The architecture of claim 1 wherein the packet processing circuitry routes packets subsequent to the given packet without regard to unavailability information embedded in the given packet.

13. The architecture of claim 1 wherein the creation of the modified given packet modifies a header of the given packet.

14. The architecture of claim 1 wherein the network switch further includes a processing core operating to communicate with a central network controller to receive the routing table and network table.

15. The architecture of claim 1 wherein the packet processing circuitry identifies a new next hop through a breadth-first-search of the network table.

16. The architecture of claim 9 wherein the given network packet includes a sequence of middle box requirements and wherein the packet processing circuitry uses the middle box requirements in a predefined order to identify the next new hop to implement a chaining of middle boxes.

* * * * *